3,133,975
SULFURIC ACID ALKYLATION WITH
MIXED OLEFIN FEED
Warren Brewer, New Sarpy, La., and John E. Hinman,
Valparaiso, Ind., assignors to Standard Oil Company,
Chicago, Ill., a corporation of Indiana
Filed Nov. 13, 1961, Ser. No. 151,789
4 Claims. (Cl. 260—683.46)

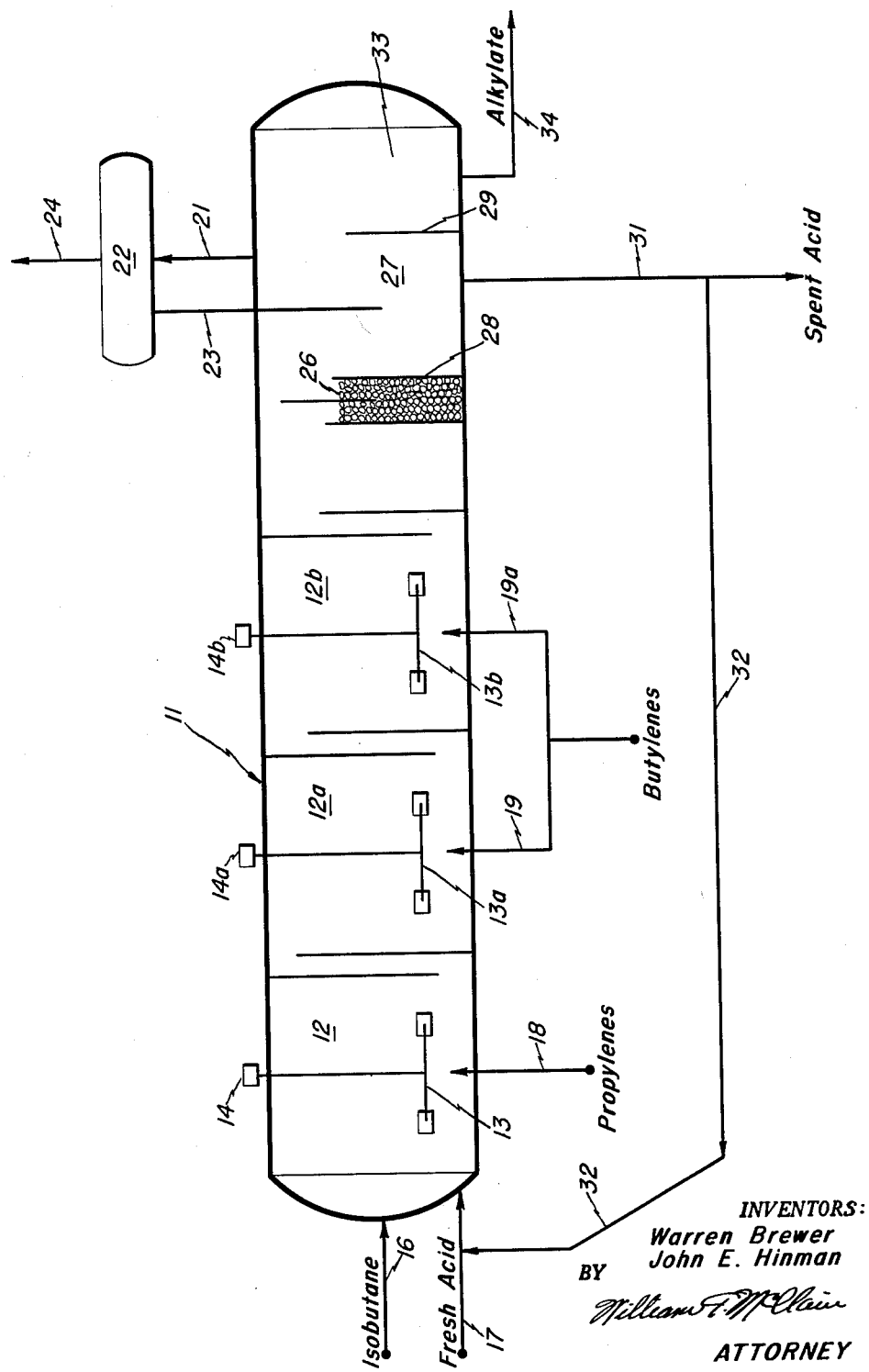

This invention relates to the alkylation of isoparaffin with $C_3$ to $C_5$ olefins in the presence of a sulfuric acid alkylation catalyst. More particularly, this invention relates to a "cascade" type sulfuric acid alkylation system for alkylating isobutane with $C_3$ to $C_5$ olefins, and to an improved method of injecting the olefins into the alkylation reaction zone.

The alkylation of isoparaffins with olefins to produce high octane alkylate as a component for motor fuel blends is well known. The alkylation of mixed olefins, such as propylenes, butylenes and amylenes, with an isoparaffin, such as isobutane, in the presence of a concentrated sulfuric acid alkylation catalyst is a principal petroleum refining process, and has been described in considerable detail in various publications (see Petroleum Refiner, volume 37, #9, September 1958, pages 316–329). When employing a cascade type sulfuric acid alkylation system it is desirable to inject olefin reactant into circulating acid-hydrocarbon emulsion in a manner which rapidly disperses the olefin as it is introduced into the reaction mixture and it is known to inject mixed olefins, such as propylenes and butylenes into the various mixing zones of a cascade alkylation system. For a description of a cascade sulfuric acid alkylation system see Petroleum Refiner, volume 37, #9, September 1958, page 254 and also U.S. Patent No. 2,429,205.

When propylene and amylene olefins are alkylated alone higher sulfuric acid consumption results than when butylene is alkylated. For example, in the alkylation of isoparaffins with propylenes it is generally desirable to employ about a 92 to 98 percent sulfuric acid, whereas lower acid strengths may be employed when employing butylenes as an olefin feed.

Propylene, butylene and amylene alkylates typically consist of mixtures of $C_5$ through $C_9$ and heavier isoparaffins. Certain isoparaffins tend to predominate, depending upon the feed olefin as follows:

| Feed Olefin | Predominant Alkylate Components |
| --- | --- |
| Propylene | 2,3-, and 2,4-dimethylpentanes. |
| Butylenes | 2,2,4-, 2,3,4-, and 2,3,3-trimethylpentanes. |
| Amylenes | 2,2,5-trimethylhexane, isopentane, 2,2,4-, 2,3,4-, and 2,3,3-trimethylpentanes. |

In conventional cascade sulfuric acid alkylation systems olefin reactant is introduced separately into a number of mixing compartments and an emulsion of isobutane, alkylate and acid flows in series through the various mixing compartments. Consequently, alkylate which is formed in the first compartments is exposed to further contact with sulfuric acid in subsequent compartments. It has been determined that alkylate degradation occurs when isoparaffins, particularly trimethylpentanes, are exposed to sulfuric acid at alkylation conditions. The loss of such high octane isoparaffins adversely affects alkylate quality and such degradation is undesirable. Of the various alkylate components, for example the trimethylpentanes (TMP), the dimethylpentanes (DMP), and the dimethylbutanes (DMB) have relatively high octane ratings in comparison to other alkylate components such as the methyl hexanes (MH), the dimethylhexanes (DMH), and the trimethylhexanes (TMH) as shown in the table below:

*Octane Ratings of Alkylate Components*

| | Boiling Point, °F. | Octane Number | | | |
| --- | --- | --- | --- | --- | --- |
| | | Research | | Motor | |
| | | Clear | +3 cc. | Clear | +3 cc. |
| $iC_5$ | 82 | 92.3 | 108.6 | 90.3 | |
| 2,3-DMB | 136 | 103.5 | | 94.3 | 112.1 |
| 2-MP | 140 | 73.4 | 93.1 | 73.5 | 91.1 |
| 3-MP | 146 | 74.5 | 93.4 | 74.3 | 91.3 |
| 2,2-DMP | 175 | 92.8 | 104.4 | 95.6 | 114.1 |
| 2,4-DMP | 177 | 83.1 | 96.6 | 83.8 | 99.1 |
| 2,3-DMP | 194 | 91.1 | 103.5 | 88.5 | 103.5 |
| 2-MH | 194 | 42.4 | 73.2 | 46.4 | 74.5 |
| 3-MH | 197 | 52.0 | 74.7 | 55.0 | 81.0 |
| 2,2,4-TMP | 211 | 100.0 | 115.5 | 100.0 | 115.5 |
| 2,2,3-TMP | 230 | 109.6 | 118 | 99.9 | 112.8 |
| 2,3,4-TMP | 236 | 102.7 | 120 | 95.9 | 106.8 |
| 2,3,3-TMP | 239 | 106.1 | 120 | 99.4 | 112.5 |
| 2,5-DMH | 228 | 55.5 | 81.6 | 55.7 | 82.9 |
| 2,4-DMH | 229 | 65.2 | 87.3 | 69.9 | 89.0 |
| 2,3-DMH | 240 | 71.3 | 91.7 | 78.9 | 93.7 |
| 3,4-DMH | 244 | 76.3 | 94.7 | 81.7 | 97.1 |
| 2,2,5-TMH | 255 | | | | |
| 2,3,5-TMH | 268 | | | | |

It has been determined that butylene alkylate, which has a high concentration of trimethylpentanes, is degraded in the presence of sulfuric acid much more than amylene alkylate, which contains less trimethylpentanes, or propylene alkylate, which contains mainly dimethylpentanes.

In accordance with the present invention there is provided a sulfuric acid catalyzed alkylation process wherein isoparaffin, sulfuric acid alkylation catalyst and $C_3$ to $C_5$ olefin reactant are emulsified and contacted under alkylation conditions in at least first and second reaction stages, and wherein there is separately introduced into the first stage a first olefin reactant containing a major proportion of a hydrocarbon selected from the group consisting of propylenes and amylenes. The resulting acid-hydrocarbon emulsion is discharged from the first stage and passed into the second stage, and a second olefin reactant containing a major proportion of butylenes is introduced into the second stage to contact the emulsion therein.

The present invention is particularly applicable to a cascade-type sulfuric acid alkylation system wherein isobutane is alkylated with $C_3$ to $C_5$ olefins, and in a preferred embodiment of the present invention, at least about 15 percent butylenes are employed with proylene as the first olefin reactant.

The olefin reactant, typically, is supplied to the various mixing zones of a cascade reactor by injecting a refinery hydrocarbon stream containing the olefin reactant in question in admixture with other components, such as normal paraffins and/or isoparaffins, into the mixing zones so as to be readily dispersed into the emulsion therein. For example, a so-called "butane-butylenes" stream, or other olefinic stream, may be injected through a sparge ring positioned near the bottom of a mixing zone beneath a mixer turning therein.

Typically, the olefinic refinery streams will have the following compositions:

*Typical Composition of Refinery Olefin Feed Streams, Vol. Percent*

|  | $C_3$= Stream (Plus Some $C_4$=) | $C_4$= Stream | $C_5$= Stream |
|---|---|---|---|
| $C_1$ | 0.2 | | |
| $C_2$= | 0.3 | | |
| $C_2$ | 4.3 | | |
| $C_3$= | 44.9 | 0.6 | |
| $C_3$ | 28.4 | 2.5 | |
| $iC_4$ | 9.0 | 34.9 | |
| $nC_4$ | 4.6 | 26.1 | |
| $C_4$= | 7.9 | 35.9 | 0.2 |
| $iC_5$ | 0.1 | | 28.5 |
| $nC_5$ | | | 3.6 |
| $C_5$= | | | 67.1 |
| $C_6+$ | 0.3 | | 0.6 |

Isobutane preferably is alkylated with the above-mentioned olefins, however, other isoparaffins may be employed, according to the processes well known in the art.

Advantageously, the present invention is employed in a cascade sulfuric acid alkylation process, wherein a number of mixing zones are employed in an elongated reaction vessel, and wherein an acid-hydrocarbon emulsion is passed in series from the first mixing zone through successive mixing zones. The number of mixing zones may vary, and preferably from three to six such zones are used. As used herein, the term "first reaction stage" refers to one or more mixing zones adjacent the point in the system where the acid-hydrocarbon emulsion is first contacted with a first olefin reactant; and the term "second reaction stage" refers to one or more such mixing zones wherein emulsion containing alkylate produced in the first stage is subsequently contacted with a second olefin reactant. Thus, in a cascade alkylation system wherein isoparaffin, olefin and acid are introduced and emulsified at the inlet end of a reaction, with acid and alkylate being withdrawn separately near the opposite end of the vessel, the second reaction stage will be located downstream of the first reaction stage in the single reaction vessel.

The present invention will be more fully understood by reference to the following description thereof and to the accompanying drawing which illustrates schematically a typical cascade sulfuric acid alkylation system wherein isobutane is alkylated with propylenes and butylenes.

Turning now to the drawing, the alkylation process is carried out in a cylindrical elongated reaction vessel 11, a portion of the interior of which is divided into a number of separate mixing zones 12, 12a and 12b by transverse baffles. These baffles are arranged so that liquid entering the inlet end of the reaction vessel passes from the first mixing zone 12 upward over a baffle down to the bottom of the next mixing stage 12a, and in a similar manner through successive mixing zones. Each mixing zone is provided with a mixer 13, 13a and 13b, driven by drivers 14, 14a and 14b respectively, positioned outside the vessel 11. Advantageously, the mixers are flat-bladed turbine mixers, turning at about 25–200 r.p.m., and preferably, at about 50–100 r.p.m. The drives preferably are about 30–100 H.P. electric motors (typically 75 H.P.) turning at 1800 r.p.m. The mixers serve to emulsify acid and isoparaffin introduced into the reaction vessel, and to intimately contact therewith olefin introduced into the mixing stages.

The acid catalyst is concentrated sulfuric acid which is maintained at a level of above about 85 percent, and preferably above 90 percent to reduce the formation of polymers of olefin, decrease catalyst contamination, reduce acid consumption and increase alkylate yield.

Isoparaffin, typically isobutane mixed with butane, and the acid catalyst comprising fresh acid or a mixture of fresh acid and used acid enter the vessel 11 near the inlet end thereof through conduits 16 and 17, respectively, where an acid-hydrocarbon emulsion is formed in the first mixing stage 12. Typically, a propane-propylenes stream containing at least about 15 percent (volume) of butylenes is introduced into the first mixing zone near the bottom thereof through conduit 18 to intimately contact the emulsion therein. However, if desired, amylenes may be introduced through conduit 18. The emulsion passes from the first mixing stage 12 (in this description also the first reaction zone) to the successive mixing zones 12a and 12b (herein the second reaction stage) where a butane-butylenes stream is introduced into each mixing zone through the conduits 19 and 19a.

The alkylation process is carried out at a temperature which may range from about 0° F.–100° F., preferably at about 35° F. Sufficient pressure is maintained therein to keep the reactants in the liquid state, typically about 2 to 15 p.s.i.g. The external isobutane to olefin ratio may range from about 3:1 to 12:1, preferably about 5:1 to 9:1, and the internal isobutane to olefin ratio may range from about 50:1 to 1000:1, preferably about 200:1 to 600:1. The olefin space velocity normally is about 0.1 to 0.6, preferably about 0.25 volume of introduced olefin per hour per volume of acid.

If desired, the olefin reactants injected into the reaction vessel 11 may be cooled by passing an olefin containing stream through a cooler (not shown) in order to minimize vaporization of the olefins upon entering the vessel. Further, the exothermic mixture of the alkylation reaction requires further cooling to remove the heat of reaction so that the temperature within the reaction stages is maintained at the required low level. Such cooling may be accomplished by withdrawing vapors from the reaction vessel 11 through conduit 21 into a dry drum 22. Liquid material settling in the dry drum is returned to the reaction vessel beneath the acid level by means of conduit 23, and dry gas from drum 22 is passed by way of conduit 24 to a compressor (not shown), compressed, condensed, and the condensate returned to the reaction vessel 11.

The hydrocarbon-acid emulsion, as noted above, is passed successively hrough the mixing zones and the effluent from the last mixing zone which comprises a mixture of alkylate, unreacted isoparaffin, acid, etc., is passed to an emulsion breaking zone 26 formed by transverse baffles and containin ga conventional inert packing material, such as Raschig rings, wire mesh or other high surface area coalescing material. The emulsion breaking zone aids in separating acid from the hydrocarbon oil, and the discharge from this zone is passed to a settling zone 27 formed by transverse baffles 28 and 29. The used acid, contaminated with polymer and other impurities, is withdrawn from the settling zone through conduit 31, and if desired, a portion may be recycled by way of conduit 32 to the reaction vessel. The separated hydrocarbon, containing alkylate, passes over the top of baffle 29 into the alkylate surged section 33 and is withdrawn by way of line 34 and then may be caustic washed and water washed to remove impurities therefrom.

To illustrate the effect of prolonged exposure to sulfuric acid alkylation catalyst on the high octane alkylate components various isoparaffins contained in alkylate were exposed to sulfuric acid at alkylation conditions and the amount of degradation determined. Typical results are as follows:

|  | Percent Reacted (45° F.) | |
| --- | --- | --- |
|  | 98% Fresh Acid | 95% Spent Acid |
| 2,2,4-trimethylpentane | 9 | 13.5 |
| 2,3,4-trimethylpentane | | 55 |
| 2,3,3-trimethylpentane | | 32 |
| 2,3- and 2,4-dimethylpentanes | 1 | |
| 2,2,5-trimethylhexane | 1.5 | |

The above tests indicate that degradation of the trimethylpentanes in the alkylate proceeds at significant rates under alkylation conditions, while the degradation of other paraffins is relatively insignificant. Thus, butylene alkylate degrades much more rapidly than amylene alkylate, which has a considerably lower concentration of trimethylpentanes, and propylene alkylate containing predominately dimethylpentanes is relatively unaffected by exposure to the acid catalyst. Consequently, prolonged exposure to acid causes a much greater octane loss for alkylate containing considerable trimethylpentanes than for alkylate containing other isoparaffins. From the foregoing description it is seen that the present invention minimizes octane loss from degradation and a higher quality alkylate may be produced.

From the foregoing description of the present invention various alternative methods of operation will become apparent to the skilled artisan, and as such, these fall within the spirit and scope of the present invention.

What is claimed is:
1. In the sulfuric acid catalyzed alkylation of isoparaffin with mixed $C_3$ to $C_5$ olefin wherein isoparaffin, sulfuric acid alkylation catalyst and olefin reactant are emulsified and contacted under alkylation conditions in at least first and second reaction stages, the method of operation which comprises separately introducing into said first stage a first olefin reactant containing a major proportion of a hydrocarbon selected from the group consisting of propylene and amylenes; discharging acid-hydrocarbon emulsion from said first stage and passing said emulsion to said second stage; and separately introducing into said second stage a second olefin reactant containing a major proportion of butylenes to contact the emulsion therein.

2. In a cascade sulfuric acid alkylation system for alkylating isoparaffin with $C_3$ to $C_5$ olefins wherein there is provided at least a first reaction stage and a second reaction stage, the method of operation which comprises separately introducing a first olefin reactant containing a major proportion of a hydrocarbon selected from the group consisting of propylenes and amylenes into said first stage to intimately contact acid-hydrocarbon emulsion therein, and introducing a second olefin reactant containing a major proportion of butylenes into said second stage to intimately contact acid-hydrocarbon emulsion therein.

3. The method of claim 2 wherein said isoparaffin is isobutane.

4. The method of claim 2 wherein said first olefin reactant contains at least about 15 percent butylenes and the balance propylenes.

References Cited in the file of this patent

UNITED STATES PATENTS

| 2,417,251 | Hemminger | Mar. 11, 1947 |
| 2,920,124 | Stiles et al. | Jan. 5, 1960 |
| 3,055,958 | Webb | Sept. 25, 1962 |